Dec. 18, 1962    J. M. COOK ET AL    3,069,151
POWER ACTUATED DOOR OPERATOR
Filed June 18, 1959    4 Sheets-Sheet 1
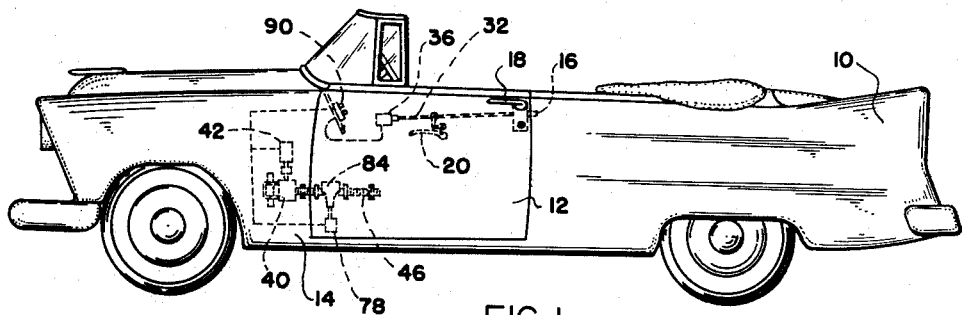
FIG. 1
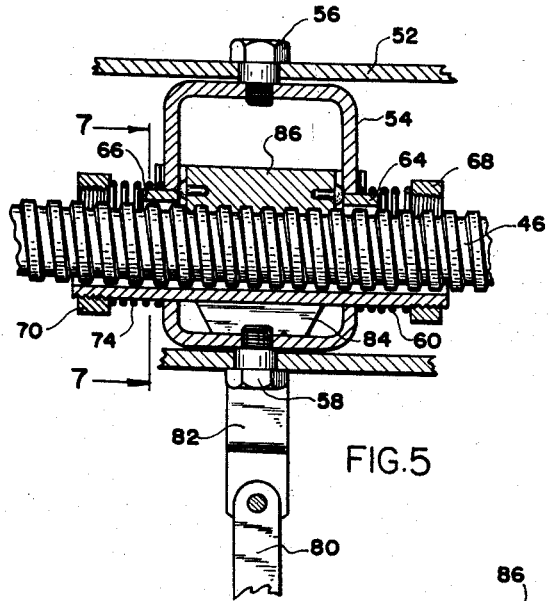
FIG. 5
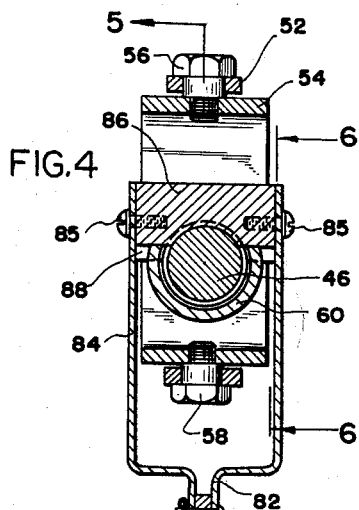
FIG. 4
FIG. 7
FIG. 6
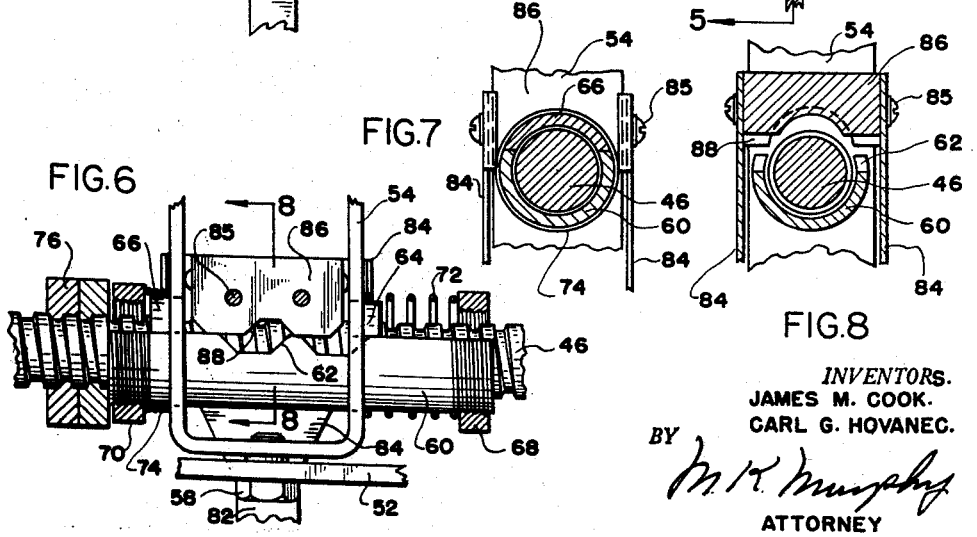
FIG. 8
INVENTORS.
JAMES M. COOK.
CARL G. HOVANEC.
BY
ATTORNEY Dec. 18, 1962  J. M. COOK ET AL  3,069,151
POWER ACTUATED DOOR OPERATOR
Filed June 18, 1959  4 Sheets-Sheet 2

INVENTORS.
JAMES M. COOK.
CARL G. HOVANEC.
BY
M K Murphy
ATTORNEY

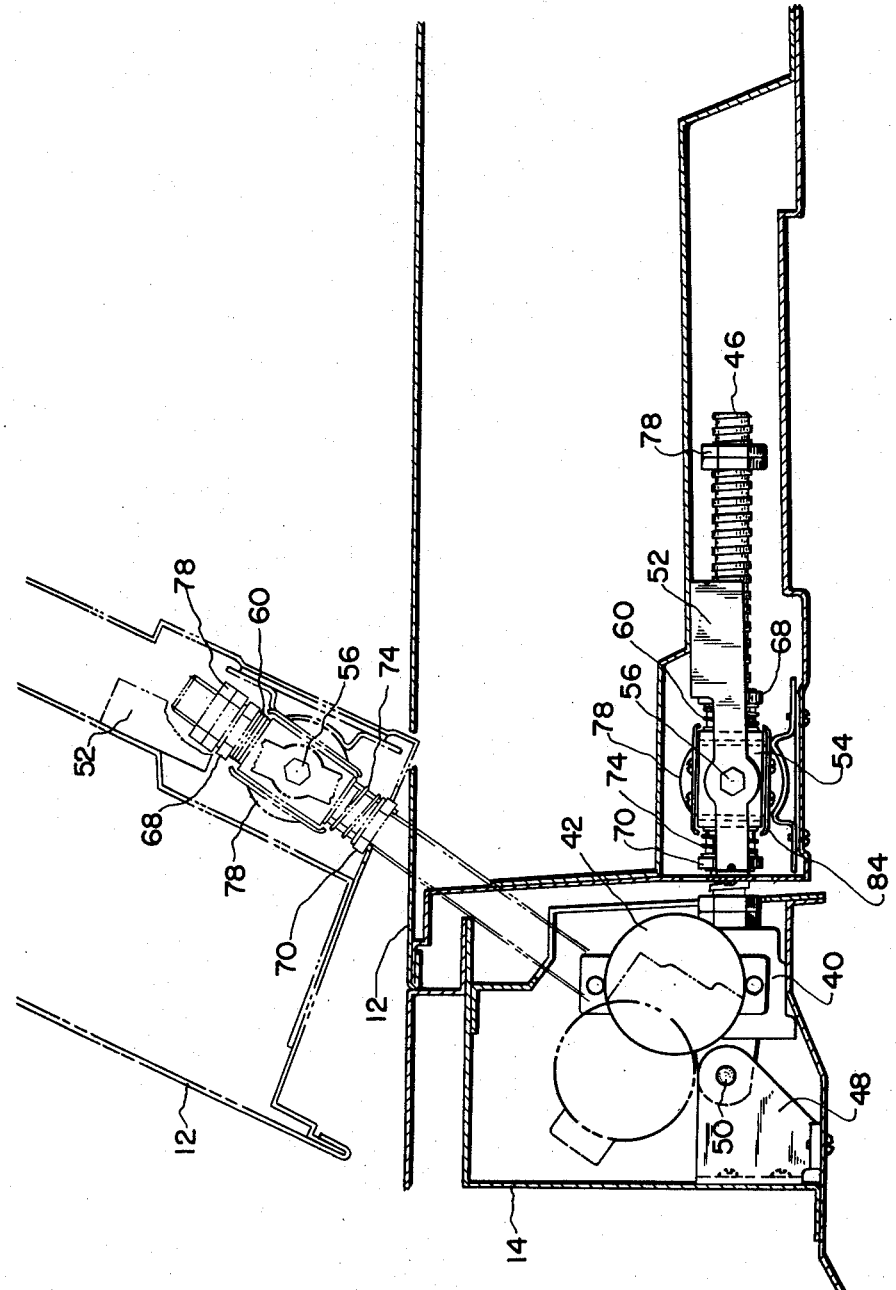

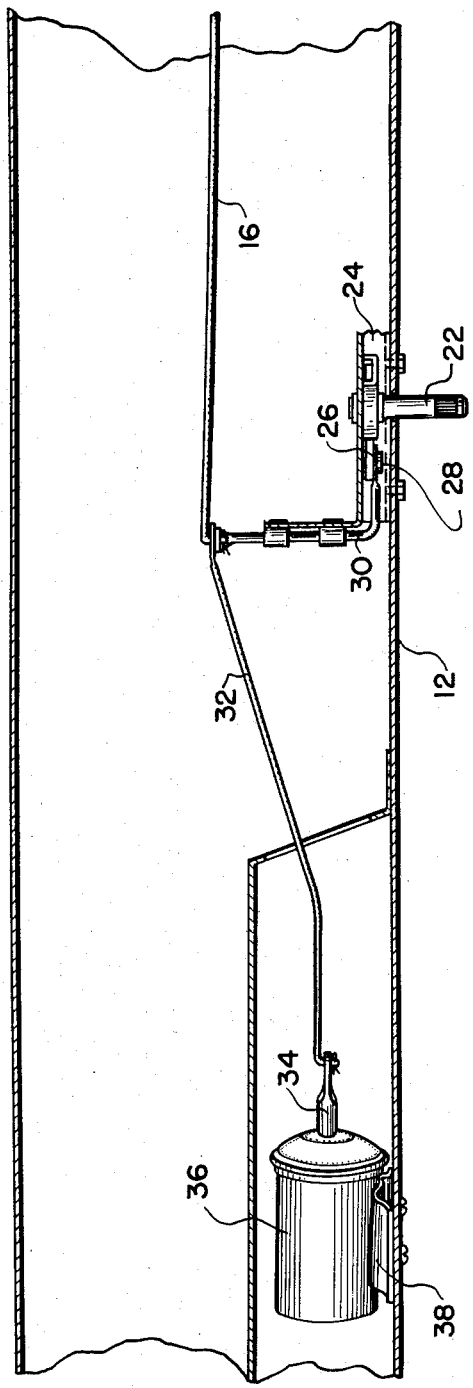

United States Patent Office 3,069,151
Patented Dec. 18, 1962

3,069,151
POWER ACTUATED DOOR OPERATOR
James M. Cook, Birmingham, and Carl G. Hovanec, St. Clair Shores, Mich., assignors to Dura Corporation, a corporation of Michigan
Filed June 18, 1959, Ser. No. 821,311
5 Claims. (Cl. 268—3)

This invention relates to power actuated door openers and closers for automobiles.

It is the object of the invention to provide remotely controlled, power actuated means for opening and closing an automobile door, which power means is separate from, and in addition to, the manually operable door opening and closing mechanism (although certain portions of the mechanism serve both functions) and which does not interfere with the regular manual door operating means.

While a preferred embodiment is shown herein, by way of example, as applied to the right hand front door, it will be understood that the invention may be applied to any of the car doors or to a rear door or tailgate.

In the accompanying drawings:

FIG. 1 is an elevation of a convertible automobile embodying the invention, the main mechanism being shown in broken lines;

FIG. 3 is a plan view taken as indicated by the line 3—3 in FIG. 2;

FIG. 4 is a section along line 4—4 of FIG. 2;

Figure 2:
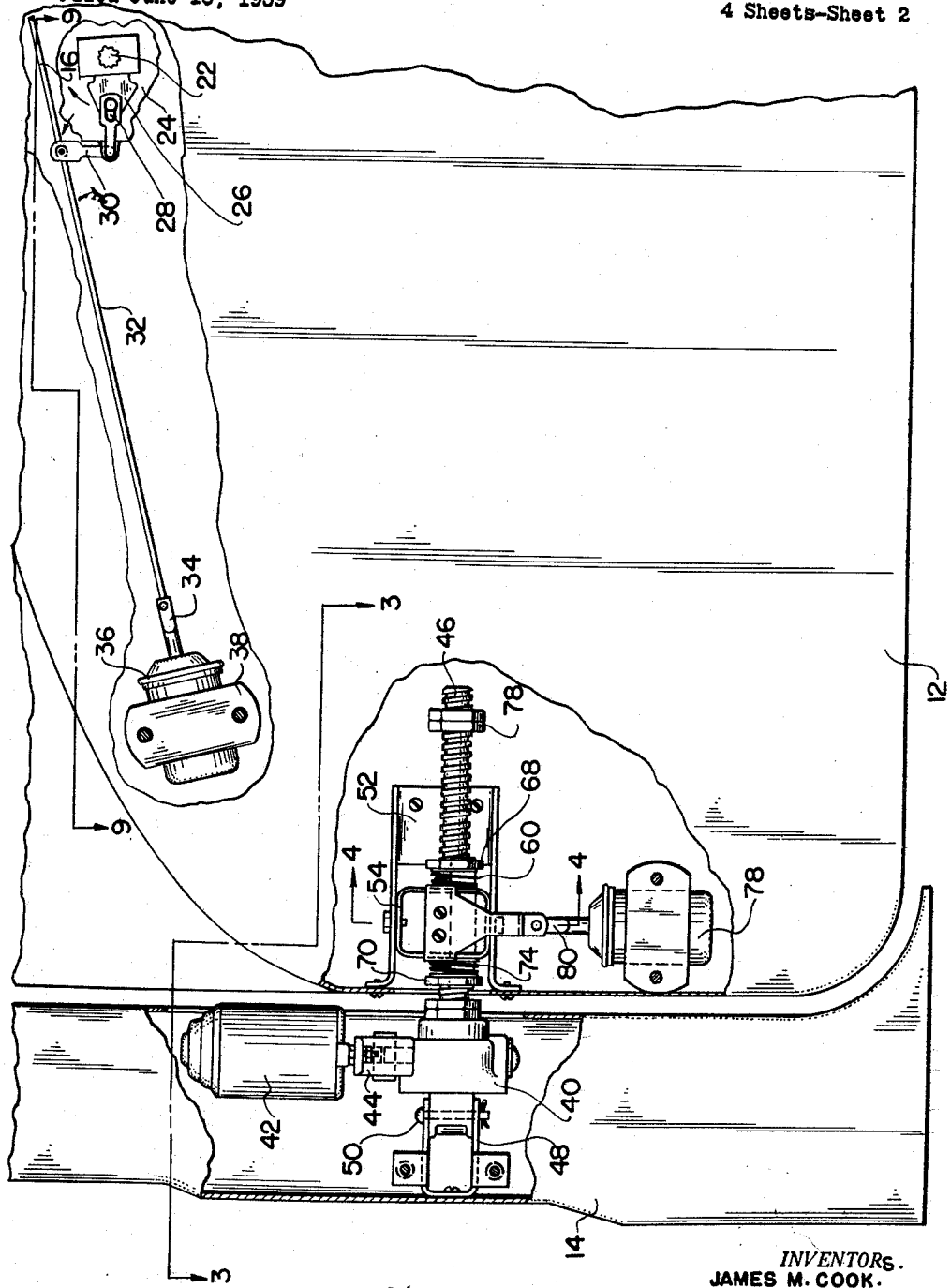
FIG. 2 is an enlarged detail of the door and body pillar with parts broken away to show the actuator.

FIGS. 5 and 6 are views taken on lines 5—5 and 6—6 respectively of FIG. 4;

FIG. 7 is a view on line 7—7 of FIG. 5;

FIG. 8 is a view on line 8—8 of FIG. 6; and

FIG. 9 is a plan view taken on line 9—9 of FIG. 2.

As may be seen from the figures, the automobile has a body 10 provided with doors 12 and pillars 14. The doors are suitably supported from the pillars by hinges which are not shown because they form no part of the invention and any standard type of automobile body hinge may be used. It is believed sufficient to state that the doors 12 are hinged to the front body pillars 14 in such manner that they may swing outwardly as shown in FIG. 3.

Each of the car doors 12 is provided with conventional latch mechanism indicated at 16, an outside door handle 18 and an inside door handle 20. The handles 18 and 20 are suitably interconnected in accordance with standard practice in the industry. The latch bolt 16 is manually actuated by rotation of a rod 22 (FIGS. 2 and 9) on which inside handle 20 is mounted.

The rod 22 is carried by a mounting plate 24 fastened to the inner panel of the door. Fixed to the rod is an arm 26 (FIGS. 2 and 9) which carries a stud 28. A bell crank 30 carried by the plate 24 has a slotted end portion which engages the stud such that when the handle 20 is swung upwardly, the bellcrank 30 is moved counterclockwise. The latch bolt 16 is fastened to the outer end of the bellcrank, so the door will be unlatched when the handle 20 is swung upwardly.

A link 32 connects the outer end of the bellcrank 30 with the plunger rod 34 of a solenoid 36. The latter is carried by a plate 38 fastened to the inner door panel. The solenoid is arranged such that energization thereof will cause the plunger rod 34 to move toward the left and thus withdraw the latch bolt 16. The rod 22 and handle 20 will be also rotated when the solenoid is energized.

Mounted in the pillar 14 is a gearbox 40 and on top of the gearbox is mounted an electric motor 42 by means of a bracket 44 (FIGS. 2 and 3). A screw 46 extends rearwardly of the body from the gearbox in cantilever fashion. The entire assembly of gearbox, motor and screw is hingedly mounted in the pillar by a hinge 48 to swing about the hinge pin 50. The gearbox comprises a more or less conventional arrangement of worm and worm wheel for drivingly connecting the shaft of motor 42 with screw 46. The motor and gearing are reversible and the screw may be driven in either direction of rotation by proper energization of the motor.

The door 12 carries a bracket 52 which is rigidly secured to the door and constitutes the power transmitting member between the screw 46 and the door. The bracket 52 mounts a yoke member 54 which is pivotable on the bracket along the axis of threaded studs 56, 58. Rotatably disposed in the yoke 54 is a cam 60 which is cylindrical in form but has a cut-away portion extending throughout its length. The solid portion of the cam constitutes more than 180° of the cylinder and is provided with cam teeth 62 at the center thereof, the purpose of which will be made clear. Welded to the yoke 54 are two arcuate members 64, 66, which mate with the cam 60, as shown in FIG. 7, and prevent any tendency of the latter to rotate.

Collars 68, 70, threadedly engage the cam 60 at each end thereof. Coil springs 72, 74, are disposed between the collars and yoke 54. These springs tend to keep the cam centered in the yoke as shown in FIG. 5, but upon movement of the bracket 52 to either of its extremes of movement as limited by the stops 76, 78, the collars 68, 70, engage the respective stop and this is accompanied by some linear movement of the cam 60 (see FIG. 6). The springs 72, 74, absorb the shock of sudden stoppage of the heavy door assembly and the linear movement of the cam performs a function explained below.

Mounted on the door below the bracket 52 is a solenoid 78. The plunger thereof is operatively secured to a strap 84 which is duplicated on the opposite side as shown in FIGS. 2 and 4-8 inclusive. The straps 84 are secured by screws 85 to a split nut 86. The latter is provided with internal screw threads which are adapted to drivingly engage the threads of screw 46, and cam teeth 88 (FIG. 6) which are adapted to engage the cam teeth 62. The drive portion of split nut 86 is of less than 180° in extent as shown in FIGS. 4 and 8.

Energization of solenoid 78 causes downward movement of plunger 80 which pulls nut 86 down into engagement with the screw 46 and the cam 60 as shown in FIGS. 4 and 5. Rotation of screw 46 then will cause the bracket 52 along with the entire door assembly to move along the screw in accordance with the direction of screw rotation, the screw assembly pivoting on the hinge 48 to accommodate the movement.

The device operates as follows:

Let it be assumed that the door 12 is in closed position as shown in FIGS. 1, 2 and 6. The spring 66 is compressed, the nut 86 is out of engagement with the screw 46 and the latch bolt 16 is engaged. Operation of the proper switch button of switch 90 (FIG. 1) will energize solenoid 36, solenoid 78 and motor 42 in door opening direction.

The solenoid 36 will pull link 32 toward the left and withdraw latch bolt 16. Spring 66 will then exert sufficient force to move the door 12 slightly on its hinges in door-opening direction, which movement will permit the solenoid plunger 80, the straps 84 and the split nut 86 to move downwardly thereby engaging the nut with the screw and the cam teeth 88 with the cam teeth 62. Because the screw 46 is rotating the door will be moved to open position or to some intermediate position as determined by the length of time the switch 90 is held, the nut 86 traveling axially outwardly of the screw.

If the door is opened to full open position, the spring 72 will be compressed between the yoke 54 and the stop member 68 and there will be some linear movement of the yoke 54 on the cam 60 which will cause cam teeth 88 to ride up the ramped teeth 62 and cam the nut 86 out of engagement with the screw 46. The screw 46 will continue rotating until the switch is released. This action occurs even though solenoid 78 is still energized, the forces being sufficient to overcome the pull of the solenoid. This camming action prevents jamming of the nut on the screw and prevents overload of the motor and possible burnout. As soon as the switch is released, the spring 72 moves the door slightly to approximately realign the cam teeth so that the mechanism is in condition for closing of the door by operation of the switch 90 in closing direction.

The closing action is the reverse of that just described except that coil spring 66 will be held in compressed condition by engagement of the latch bolt 16 until the door is opened again. It is desirable that the outer stop 78 be positioned in such relation to the arc of swing of the door on its hinges that the regular door stop (not shown) conventionally used on automobile doors will hold the door open after the spring 72 has exerted its force.

It will be seen that the power door operator does not in any way interfere with normal opening and closing of the door by manipulation of the handles 18 or 20. Operation of either of these handles will withdraw latch bolt 16 through swing of bellcrank 30, solenoid plunger 34 being free for incidental movement, and the screw 46 being free for movement relative to the members 60 and 86 because of the non-engaged position of the nut 86. It will be understood that solenoids 36 and 78 are provided with conventional return springs which keep their respective plungers in normal position except when the coils are energized.

Thus it will be seen that the invention provides a simple mechanism for remotely operating an automobile door or the like by power means, which mechanism does not interfere with the standard manually operated control means.

While but a single specific example has been shown for illustrative purposes, it will be understood that the device is capable of modifications and changes and it is not desired to limit the scope of the invention except as set forth in the following claims.

We claim:

1. In combination with a closure operator for a closure hinged adjacent one edge to a support for swinging movement relatively to said support, a gearbox hingedly mounted on said support, a motor mounted on said gearbox and drivingly connected thereto, a screw carried by said gearbox in driven relation therewith, a nut member movably carried by said closure, means for releasably maintaining said nut member out of driving engagement with said screw thereby to permit free manual operation of said closure, power operated means for drivingly engaging said nut with said screw, stop means on said screw for limiting swinging of said closure, and cam means operatively associated with said stop means and said nut for camming said nut out of driving engagement with said screw in response to operation of said stop means.

2. In a power operated door control in combination, a rotatable screw, a nut engageable with said screw and operable upon rotation of said screw to open or close the door, stops on said screw for limiting travel of said nut in either direction, a cam operatively associated with said nut and said stops and operable in response to engagement of said cam with one of said stops to disengage said nut from said screw, and spring means operatively associated with said cam constantly urging said cam to a position permitting said nut to engage said screw.

3. In the combination set forth in claim 2, means yieldably urging said nut to disengaged position and power means for engaging said nut.

4. In a power operated door control, in combination, a latch bolt, power means for withdrawing said bolt, power actuated screw and nut means for opening and closing the door, power means for drivingly engaging the nut and screw, switch means for simultaneously energizing said several power means, means automatically disengaging said nut and screw in response to closing of said door to latched position, and spring actuated means automatically operable to position said nut and screw for engagement by said power means in response to withdrawal of said bolt.

5. The combination set forth in claim 4 wherein said disengaging means comprises a cam operatively associated with said nut and screw.

References Cited in the file of this patent

UNITED STATES PATENTS

| | | |
|---|---|---|
| 1,151,479 | Kurtz | Aug. 24, 1915 |
| 1,674,662 | Rowntree | June 26, 1928 |
| 2,612,057 | Gray et al. | Sept. 30, 1952 |
| 2,628,091 | Rappl | Feb. 10, 1953 |
| 2,726,893 | Zucker | Dec. 13, 1955 |

FOREIGN PATENTS

| | | |
|---|---|---|
| 421,433 | Great Britain | Dec. 20, 1934 |